US009657195B2

(12) United States Patent
Kaminaga et al.

(10) Patent No.: US 9,657,195 B2
(45) Date of Patent: May 23, 2017

(54) AQUEOUS COATING AGENT AND GAS BARRIER FILM

(71) Applicant: TOPPAN PRINTING CO., LTD., Taito-ku (JP)

(72) Inventors: Junichi Kaminaga, Taito-ku (JP); Harumi Matsumoto, Taito-ku (JP); Sayaka Hoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 126 days.

(21) Appl. No.: 14/470,139

(22) Filed: Aug. 27, 2014

(65) Prior Publication Data

US 2014/0370270 A1 Dec. 18, 2014

Related U.S. Application Data

(63) Continuation of application No. PCT/JP2013/055232, filed on Feb. 27, 2013.

(30) Foreign Application Priority Data

Feb. 28, 2012 (JP) ................................. 2012-041251

(51) Int. Cl.
| | |
|---|---|
| *C09D 175/04* | (2006.01) |
| *C09D 129/04* | (2006.01) |
| *B32B 27/40* | (2006.01) |
| *B32B 27/30* | (2006.01) |
| *C08G 18/72* | (2006.01) |
| *C08G 18/75* | (2006.01) |
| *C08G 18/76* | (2006.01) |
| *C08G 18/80* | (2006.01) |
| *C08G 18/08* | (2006.01) |
| *C08G 18/32* | (2006.01) |
| *C09D 5/02* | (2006.01) |
| *C09D 7/12* | (2006.01) |
| *B32B 7/12* | (2006.01) |
| *B32B 27/08* | (2006.01) |

(52) U.S. Cl.
CPC .............. *C09D 175/04* (2013.01); *B32B 7/12* (2013.01); *B32B 27/08* (2013.01); *B32B 27/306* (2013.01); *B32B 27/40* (2013.01); *C08G 18/0823* (2013.01); *C08G 18/3206* (2013.01); *C08G 18/3271* (2013.01); *C08G 18/3275* (2013.01); *C08G 18/722* (2013.01); *C08G 18/751* (2013.01); *C08G 18/757* (2013.01); *C08G 18/7614* (2013.01); *C08G 18/8048* (2013.01); *C09D 5/024* (2013.01); *C09D 7/1291* (2013.01); *C09D 129/04* (2013.01); *B32B 2250/24* (2013.01); *B32B 2255/10* (2013.01); *B32B 2255/26* (2013.01); *B32B 2307/7242* (2013.01); *B32B 2439/70* (2013.01); *B32B 2439/80* (2013.01); *Y10T 428/25* (2015.01); *Y10T 428/251* (2015.01); *Y10T 428/256* (2015.01)

(58) Field of Classification Search
CPC ............ C08G 18/0823; C08G 18/3206; C08G 18/3271; C08G 18/3275; C08G 18/722; C08G 18/751; C08G 18/757; C08G 18/7614; C08G 18/8048; C09D 129/04; C09D 175/04; C09D 5/024; C09D 7/1291; Y10T 428/25; Y10T 428/251; Y10T 428/256; Y10T 428/31551; Y10T 428/31576; B32B 2250/24; B32B 2255/10; B32B 2255/26; B32B 2307/7242; B32B 2439/70; B32B 2439/80; B32B 27/08; B32B 27/12; B32B 27/306; B32B 27/40
USPC ...... 428/323, 324, 328, 423.1; 524/449, 445
See application file for complete search history.

(56) References Cited

U.S. PATENT DOCUMENTS

| | | | | |
|---|---|---|---|---|
| 6,569,533 | B1 * | 5/2003 | Uchida et al. .............. | 428/423.1 |
| 2003/0207122 | A1 | 11/2003 | Uchida et al. | |
| 2005/0084686 | A1 * | 4/2005 | Imaizumi ........... | C08G 18/0823 428/425.5 |
| 2009/0280333 | A1 * | 11/2009 | Kuwata et al. ............ | 428/423.7 |

FOREIGN PATENT DOCUMENTS

| | | |
|---|---|---|
| CN | 1618906 A | 5/2005 |
| CN | 100434476 C | 11/2008 |
| CN | 100494296 C | 6/2009 |

(Continued)

OTHER PUBLICATIONS

Combined Office Action and Search Report issued Oct. 30, 2015 in Chinese Patent Application No. 201380011253.2 (with partial English language translation and English translation of categories of cited documents).

(Continued)

*Primary Examiner* — Thao T Tran
(74) *Attorney, Agent, or Firm* — Oblon, McClelland, Maier & Neustadt, L.L.P.

(57) ABSTRACT

An aqueous coating composition includes an aqueous polyurethane resin including a polyurethane resin having an acid group and a polyamine compound, a water-soluble polymer, and an inorganic layered mineral. The aqueous polyurethane resin is included at a solid content of 50-80 mass %, the water-soluble polymer is included at a solid content of 5-20 mass %, and the inorganic layered mineral is included at a solid content of 10-30 mass %, relative to a total solid content of the aqueous coating composition. The aqueous coating composition has a total solid concentration of not less than 5 mass % and a viscosity of not larger than 50 mPa-second at 23° C.

20 Claims, No Drawings

(56) References Cited

FOREIGN PATENT DOCUMENTS

| | | | |
|---|---|---|---|
| JP | 6-093133 A | | 4/1994 |
| JP | 9-150484 A | | 6/1997 |
| JP | 09-151265 A | | 6/1997 |
| JP | 11-165369 A | | 6/1999 |
| JP | 2001-287294 A | | 10/2001 |
| JP | 3351208 B2 | | 9/2002 |
| JP | 2003213205 A | * | 7/2003 |
| JP | 2005-059329 A | | 3/2005 |
| JP | 2005-138581 A | | 6/2005 |
| JP | 2005-139436 A | | 6/2005 |
| JP | 3764109 B2 | | 1/2006 |
| JP | 2008-143103 A | | 6/2008 |
| JP | 2009-241359 A | | 10/2009 |
| JP | 4434907 B2 | | 1/2010 |
| TW | 200716367 A | | 5/2007 |

OTHER PUBLICATIONS

International Search Report issued Apr. 23, 2013 in PCT/JP2013/055232 (with English Translation).
Taiwanese Office Action dated Aug. 4, 2016, in Taiwanese Patent Application No. 102107176 (with English Translation).

* cited by examiner

AQUEOUS COATING AGENT AND GAS BARRIER FILM

CROSS-REFERENCE TO RELATED APPLICATIONS

The present application is a continuation of International Application No. PCT/JP2013/55232, filed Feb. 27, 2013, which is based upon and claims the benefits of priority to Japanese Application No. 2012-041251, filed Feb. 28, 2012. The entire contents of these applications are incorporated herein by reference.

TECHNICAL FIELD

This invention relates to an aqueous coating agent and a gas barrier film which is used in the packaging fields of foods, which hate moisture or oxygen, such as dried foods, confectioneries, breads and pastries, delicacies and the like, and medicinal products such as disposable body warmers, tablets, powders, poultice, adhesive skin patches and the like. More particularly, the invention relates to an aqueous coating agent, a gas barrier film and a gas barrier laminate used in packaging fields where high gas barrier properties and transparency that allows product recognition are desired.

BACKGROUND ART

Packaging materials used for foods and medicinal products are desired to have properties (gas barrier properties) of interrupting the permeation of vapor, oxygen and other gases capable of causing product quality to be deteriorated so as to suppress the product from being deteriorated or decayed and retain the function and properties of foods and medicinal products.

SUMMARY OF THE INVENTION

According to one aspect of the present invention, an aqueous coating composition includes an aqueous polyurethane resin including a polyurethane resin having an acid group and a polyamine compound, a water-soluble polymer, and an inorganic layered mineral. The aqueous polyurethane resin is included at a solid content of 50-80 mass %, the water-soluble polymer is included at a solid content of 5-20 mass %, and the inorganic layered mineral is included at a solid content of 10-30 mass %, relative to a total solid content of the aqueous coating composition. The aqueous coating composition has a total solid concentration of not less than 5 mass % and a viscosity of not larger than 50 mPa-second at 23° C.

According to another aspect of the present invention, a gas barrier film includes a base film including a plastic film, and a film layer formed on the base film and including an aqueous polyurethane resin, a water-soluble polymer, and an inorganic layered mineral. The aqueous polyurethane resin comprises a polyurethane resin having an acid group and a polyamine compound, and the film layer includes 50-80 mass % of the aqueous polyurethane resin, 5-20 mass % of the water-soluble polymer, and 10-30 mass % of the inorganic layered mineral.

According to yet another aspect of the present invention, a gas barrier laminate includes a base film comprising a plastic material, a gas barrier layer formed on the base film, a protective layer formed on the gas barrier layer, an adhesive layer formed on the protective layer, and a heat-sealable resin layer formed on the adhesive layer. The gas barrier layer is a film comprising an aqueous polyurethane resin, a water-soluble polymer, and an inorganic layered mineral. The aqueous polyurethane resin comprises a polyurethane resin having an acid group and a polyamine compound. The film formed by the gas barrier layer includes 50-80 mass % of the aqueous polyurethane resin, 5-20 mass % of the water-soluble polymer, and 10-30 mass % of the inorganic layered mineral.

DETAILED DESCRIPTION OF THE EMBODIMENTS

The embodiments will now be described with reference to the accompanying drawings, wherein like reference numerals designate corresponding or identical elements throughout the various drawings.

The aqueous coating agent of the first embodiment of the invention, the gas barrier film of the second embodiment of the invention and the gas barrier laminate of the third embodiment of the invention are now described.

It will be noted that these embodiments are particularly described for better understanding of the concept of the invention and should not be construed as limiting the invention thereto unless otherwise indicated.

Aqueous Coating Agent

The aqueous coating agent of the first embodiment of the invention includes, as major constituents, an aqueous polyurethane (A) containing a polyurethane resin having an acid group and a polyamine compound, (B) a water-soluble polymer, and (C) an inorganic layered mineral wherein the solid content ratios of the aqueous polyurethane resin (A), water-soluble polymer (B) and inorganic layered mineral (C) present in the total solid content are within the following ranges and a total solid concentration is not less than 5 mass % and a viscosity at 23° C. is not larger than 50 mPa-second.

Aqueous polyurethane resin (A): 50-80 mass %
Water-soluble polymer (B): 5-20 mass %
Inorganic layered mineral (C): 10-30 mass %

The acid group of the polyurethane resin (anionic self-emulsified polyurethane resin) making up of the aqueous polyurethane resin (A) includes a carboxyl group, a sulfonic group or the like.

Although the acid group may be located at either a terminal or side chain of the polyurethane resin, the acid group is located at least at a side chain of the polyurethane resin. This acid group can be usually neutralized with a neutralizer (base) and may form a salt along with a base. It should be noted that the acid group may be bound with an amino group (an imino group or a tertiary nitrogen atom) of the polyamine compound constituting the aqueous polyurethane resin (A).

The acid value of the polyurethane resin can be selected within a range capable of imparting water solubility or water dispersibility and is generally at 5-100 mg KOH/g, preferably at 10-70 mg KOH/g (e.g. 10-60 mg KOH/g) and more preferably at 15-60 mg KOH/g (e.g. 16-50 mg KOH/g).

The total concentration of a urethane group and a urea group (urea group) of the polyurethane resin is preferably at not less than 15 mass %, more preferably at 20-60 mass %, from the standpoint of gas barrier properties.

It will be noted that the urethane group concentration and urea group concentration, respectively, mean a value of the molecular weight of the urethane group (59 g/equivalent) or the molecular weight of the urea group (primary amino group (amino group): 58 g/equivalent, secondary amino group (imino group): 57 g/equivalent) divided by the molecular weight of the recurring units of the polyurethane resin.

It will also be noted that when a mixture is used as a polyurethane resin, the concentration of urethane group and concentration of urea group can be, respectively, calculated based on the charging ratio of the respective reaction constituents, i.e. the ratio of the respective constituents used.

The polyurethane resin usually has at least rigid units (units constituted of a hydrocarbon ring) and short-chain units (e.g. units constituted of a hydrocarbon chain). More particularly, the recurring units of the polyurethane resin generally contain a hydrocarbon ring (an aromatic and/or non-aromatic hydrocarbon ring) which is derived from a polyisocyanate component, a polyhydroxy acid component, a polyol component or a chain elongation component (especially, at least a polyisocyanate component).

The ratio of the hydrocarbon ring units to the recurring units of the polyurethane is generally at 10-70 mass %, preferably at 15-65 mass % and more preferably at 20-60 mass %.

The number average molecular weight of the polyurethane resin may be appropriately chosen and is preferably at 800-1,000,000, more preferably at 800-200,000 and much more preferably at 800-100,000.

The polyurethane resin may be a crystalline polyurethane resin so as to enhance gas barrier properties.

The glass transition point of the polyurethane resin is preferably at not less than 100° C. (e.g. about 100-200° C.), more preferably at not less than 110° C. (e.g. about 110-180° C.) and much more preferably at not less than 120° C. (e.g. about 120-150° C.).

The aqueous polyurethane resin (A) generally contains a neutralizer and is formed by dissolving or dispersing the above-stated polyurethane resin in an aqueous medium.

For the aqueous medium, mention is made of water, an aqueous solvent, a hydrophilic solvent or a mixed solvent thereof. The aqueous medium is generally water or an aqueous medium containing water as a main component.

The hydrophilic medium includes, for example, an alcohol such as ethanol, isopropanol or the like, a ketone such as methyl ethyl ketone or the like, an ether such as tetrahydrofuran or the like, a cellosolve, a carbitol, a nitrile such as acetonitrile, or the like.

The aqueous polyurethane resin (A) may be either an aqueous solution of the polyurethane resin dissolved in an aqueous medium or an aqueous dispersion of the polyurethane resin dispersed in an aqueous medium.

In the aqueous dispersion, the average particle size of dispersed particles (polyurethane resin particles) is not critically limited and is, for example, at 20-500 nm, preferably at 25-300 nm ad more preferably at 30-200 nm.

A method for preparing the aqueous polyurethane (A) is not particularly limited, for which there are used ordinary aqueous conversion techniques of polyurethane resin such as an acetone method, a prepolymer method and the like.

For the urethanation reaction, there may be used, as necessary, a urethanation catalyst such as an amine catalyst, a tin catalyst, a lead catalyst or the like.

For instance, an aqueous polyurethane resin (A) can be prepared by reacting a polyisocyanate compound, a polyhydroxy acid and, as necessary, a polyol component and/or a chain extension component in an inert organic solvent including a ketone such as acetone, an ether such as tetrahydrofuran or a nitrile such as acetonitrile. More particularly, a polyisocyanate compound and a polyhydroxy acid and a polyol component are reacted in an inert organic solvent (particularly, a hydrophilic or water-soluble organic solvent) to form a prepolymer having an isocyanate group at terminals thereof, followed by neutralization with a neutralizer and dissolution or dispersion in an aqueous medium. Thereafter, a chain extension component is added for reaction, from which the organic solvent is removed to prepare an aqueous polyurethane resin (A).

With the case of the aqueous polyurethane resin (A), the polyamine compound serving as a crosslinking agent is bound to the acid group of the polyurethane resin thereby developing gas barrier properties.

It will be noted that the binding between the polyamine compound and the acid group of the polyurethane resin may be ion binding (e.g. ion binding between a tertiary amino group and a carboxyl group) or covalent binding (e.g. amide binding).

To this end, the polyamine compounds used may include a variety of polyamines having two or more basic nitrogen atoms and selected from the group consisting of a primary amino group, a secondary amino group and a tertiary amino group.

The polyamine compound used in the aqueous polyurethane resin (A) is not critical so far as it is one which is capable of binding with an acid group and is able to improve gas barrier properties, for which a variety of compounds are usable.

The polyamine compound used is one whose amine value is generally at 100-1900 mg KOH/g, preferably at 150-1900 mg KOH/g (e.g. 200-1700 mg KOH/g) and more preferably at 200-1900 mg KOH/g (e.g. 300-1500 mg KOH/g). The amine value of the polyamine compound may be at about 300-1900 mg KOH/g.

The water-soluble polymer (B) means one which can be either completely dissolved in or finely dispersed in water.

The water-soluble polymer (B) is not critical in type so far as it is able to undergo intrusion and intercalation between the unit crystal layers of the inorganic layered mineral (C) described hereinafter. For instance, mention is made of polyvinyl alcohol and derivatives thereof, cellulose derivatives such as carboxymethyl cellulose, hydroxyethyl cellulose and the like, starches such as oxidized starch, etherized starch, dextrin and the like, polyvinylpyrrolidone, polyacrylic acid and polymethacrylic acid or esters, salts and copolymers thereof, copolymerized polyesters having a polar group such as of a sulfoisophthalic acid, vinyl polymers such as polyhydroxyethyl methacrylate and copolymers thereof, urethane polymers, or polymers wherein functional groups of these various polymers, such as a carboxyl group, are modified.

The water-soluble polymer (B) is preferably made, as least one type thereof, of a polyvinyl alcohol polymer or a derivative of the polyvinyl alcohol polymer. More preferably, mention is made of a polyvinyl alcohol resin having a degree of saponification of not less than 95% and a degree of polymerization of 300-2000.

With the polyvinyl alcohol resin, higher degrees of saponification and polymerization lead to lower hygroscopic swelling properties.

If the degree of saponification of polyvinyl alcohol resin is lower than 95%, it is less likely to obtain satisfactory gas barrier properties.

When the degree of polymerization of polyvinyl alcohol resin is lower than 300, gas barrier properties lower. On the other hand, when the degree of polymerization of polyvinyl alcohol resin exceeds 2000, the viscosity of an aqueous coating agent increases, making it difficult to uniformly mix the polyvinyl alcohol resin with other components. Eventually, disadvantages such as lowerings of gas barrier properties and adhesion are invited. Since a coating amount relatively increases by lowering a solid component concentration, an increase in energy for drying and a lowering of productivity are unfavorably invited. More particularly, when using a polyvinyl alcohol resin whose degree of polymerization is 2000 or below, a rise in viscosity of an aqueous coating agent is suppressed, thus enabling uniform mixing or dispersion with other components. In this way, it can be realized to provide an aqueous coating agent of high concentration with a reduced viscosity, and thus it becomes possible to stabilize the characteristic properties of the aqueous coating agent and reduce the coating amount by rendering the aqueous coating agent high in concentration and also reduce a drying load, thereby contributing to improved productivity.

The inorganic layered mineral (C) is an inorganic compound wherein very thin unit crystal layers are superposed to form one lamellar particle.

The inorganic layered mineral (C) should preferably be ones which can undergo swelling/cleavage. Of these, clay compounds having swellability with water are preferably used. More particularly, mention is made of clay compounds wherein water is coordinated between the very thin unit crystal layers and which have the ability to absorb and swell. In general, clay compounds are those having such a layer structure wherein a layer constituting a tetrahedral structure by coordinating $SiO^{4+}$ to $O^{2-}$ and a layer constituting an octahedral structure by coordinating $Al^{3+}$, $Mg^{2+}$, $Fe^{2+}$, $Fe^{3+}$ or the like to $O^{2-}$ and $OH^-$, are bound at 1:1 or 1:2 and built up. This clay compound may be either a natural or synthetic one.

As a typical inorganic layered mineral (C), mention is made of hydrous silicate salts such phyllosilicates including, for example, kaolinite clay minerals such as halloysite, kaolinite, endenite, dickite, nacrite and the like, antigorite clay minerals such as antigorite, chrysotile and the like, smectite clay minerals such as montmorillonite, beidellite, nontronite, saponite, hectorite, sauconite, stevensite and the like, vermiculite clay minerals such as vermiculite and the like, and micas or mica clay minerals such as muscovite, phlogopite and the like, and margarite, tetrasililic mica, taeniolite and the like.

These inorganic layered minerals (C) may be used singly or in combination of two or more.

Of these inorganic layered minerals (C), smectite clay minerals such as montmorillonite and mica clay minerals such as water-swelling mica are preferred.

The inorganic layered mineral preferably has an average particle size of not larger than 10 μm and a thickness of not larger than 500 nm. The inorganic layered mineral (C) should preferably contain at least one type of water-swelling synthetic mica having an average size of 1-10 μm and a thickness of 10-100 nm. When using a water-swelling synthetic mica as inorganic layered mineral (C), this water-swelling synthetic mica has high miscibility with aqueous polyurethane resin (A) and water-soluble polymer (B) and is reduced in impurity content over the case of natural micas. Thus, a lowering of gas barrier properties and a lowering of film cohesive force as will be derived from impurities do not occur. Water-swelling synthetic mica has fluorine atoms in the crystal structure thereof and thus, contribute to suppressing, to a low level, the humidity dependence of the gas barrier properties of the film formed out of an aqueous coating agent. Moreover, the water-swelling synthetic mica has an aspect ratio higher than other types of water-swelling inorganic layered minerals, so that a labyrinth effect works more effectively and this mica contributes to developing high gas barrier properties of the film made of an aqueous coating agent.

If the solid content ratio of the aqueous polyurethane resin (A) relative to the total solid content is less than 50 mass %, wettability and adhesion of a film made of an aqueous coating agent to a base film, water resistance, moisture resistance and film cohesive strength become poor. On the other hand, when the solid content ratio of the aqueous polyurethane resin (A) exceeds 80 mass %, the gas barrier properties of the film made of an aqueous coating agent lower.

If the solid content ratio of the water-soluble polymer (B) relative to the total solid content is less than 5 mass %, the cohesive strength of the film made of an aqueous coating agent lowers. On the other hand, when the solid content ratio of the water-soluble polymer (B) exceeds 20 mass %, the gas barrier properties of the film made of an aqueous coating agent lower under high humidity conditions.

If the solid content ratio of the inorganic layered mineral (C) relative to the total solid content is less than 10 mass %, satisfactory gas barrier properties cannot be imparted to the film made of an aqueous coating agent. On the other hand, when the content exceeds 30 mass %, adhesion, to a base film, of the film made of an aqueous coating agent and the cohesive strength of the film made of the aqueous coating agent lower.

When a water-soluble or water-dispersible reactive curing agent is added to the aqueous coating agent of the first embodiment of the invention, adhesion to a base substrate, film cohesive strength, water resistance and solvent resistance can be further improved.

As a reactive curing agent, mention is made of a water-dispersible (water-soluble) polyisocyanate, a water-dispersible (water-soluble) carbodiimide, a water-soluble epoxy compound, a water-dispersible (water-soluble) oxazolidone compound, a water-soluble aziridine compound or the like.

Further, the aqueous coating agent of the first embodiment of the invention may further contain a variety of additives within ranges not impeding the gas barrier properties and strength sufficient for use as a packaging laminate film.

The additives include, for example, an antioxidant, a weathering agent, a thermal stabilizer, a lubricant, a crystal nucleating agent, a UV absorber, a plasticizer, an antistatic agent, a colorant, a filler, a surface active agent, a silane coupling agent and the like.

The solvent for the aqueous coating agent of the first embodiment of the invention is mainly composed of water and may further contain a solvent which is dissolved in or uniformly mixed with water.

Examples of the solvent include alcohols such as methanol, ethanol, isopropanol and the like, ketones such as acetone, methyl ethyl ketone and the like, ethers such as tetrahydrofuran and the like, cellosolves, carbitols, and nitriles such as acetonitrile and the like.

With existing aqueous barrier coating agents using combinations of aqueous resins and inorganic layered minerals, it is necessary to control a solid concentration at 5% or below so as to suppress a viscosity ensuring coating adaptability.

In contrast thereto, the aqueous coating agent of the first embodiment of the invention contains aqueous polyurethane resin (A), water-soluble polymer (B) and inorganic layered mineral (C) and has a total solid concentration of not less than 5 mass % and a viscosity of not larger than 50 mPa-second at 23° C. The aqueous coating agent can be applied with many coating techniques described hereinafter and is responsible for good coating performance. Moreover, a wet coating amount used for the formation of a dried film having a desired thickness can be set at a low level, thereby contributing to reducing a drying energy and improving a processing speed.

The aqueous coating agent of the first embodiment of the invention preferably has a total solid concentration of not less than 8 mass % and a viscosity of 10-50 mPa-second at 23° C. and more preferably a total solid concentration of not less than 10 mass % and a viscosity of 10-40 mPa-second at 23° C.

The aqueous coating agent of the first embodiment of the invention contains, as major constituents, aqueous polyurethane resin (A), water-soluble polymer (B) and inorganic layered mineral (C) wherein solid content ratios of aqueous polyurethane resin (A), water-soluble polymer (B) and inorganic layered mineral (C) in the total solid content are such that the aqueous polyurethane resin (A) is at 50-80 mass %, the water-soluble polymer (B) is at 5-20 mass % and the inorganic layered mineral (C) is at 10-30 mass % and thus, no material, which acts as a generation source of harmful substances at the time of disposal, is contained.

The aqueous polyurethane (A) differs from ordinary polyurethane resins in that it has gas barrier properties due to its rigid molecular skeleton and a dried film thereof is insoluble in water like ordinary polyurethane resins, resulting in a gas barrier film that exhibits low humidity dependence. However, the gas barrier properties of the aqueous polyurethane resin alone are much poorer than those of polyvinylidene chloride resin. In order to cope with this, the inorganic layered mineral (C) is added so as to improve the gas barrier properties depending on the amount thereof. As a result, gas barrier properties corresponding to or better than those of polyvinylidene chloride resin are obtained. However, as the amount of the inorganic layered mineral increases, the cohesive force of the resulting film abruptly decreases to an extent that adhesion strength suited for use as a packaging laminate film cannot be maintained.

Although there has been hitherto known a gas barrier film wherein water-soluble polymer (B) (e.g. a polyvinyl alcohol resin or the like) and water-swelling inorganic layered mineral (C) are compositized, the cohesive force of film and adhesion strength to a base substrate lower as well, thus needing addition of a crosslinking component.

However, the addition of a crosslinking component impedes a uniform molecular arrangement ensuring good gas barrier properties, so that it has been very difficult to ensure compatibility between good barrier properties of the film obtained by compositizing water-soluble polymer (B) and water-soluble inorganic layered mineral (C) in an atmosphere of high humidity and satisfactory adhesion strength.

The aqueous coating agent of the first embodiment of the invention contains, as major constituents, aqueous polyurethane resin (A), water-soluble polymer (B) and inorganic layered mineral (C) wherein the solid content ratios thereof are controlled within predetermined ranges, so that good gas barrier properties of the film made of the aqueous polymer agent in an atmosphere of high humidity can be compatible with satisfactory adhesion (film cohesive force) for use as a packaging laminate film.

The film made of the aqueous coating agent of the first embodiment of the invention is excellent in gas barrier properties in an atmosphere of high humidity and good at adhesion to a base substrate and cohesive force. Thus, when a gas barrier film having such a film as set out above is used as a packaging material, product quality retention can be enhanced, thus enabling its use as a variety of packaging materials.

The aqueous coating agent of the first embodiment of the invention is low in viscosity in spite of the solid concentration being high, with the attendant effect that productivity in the coating step onto a base substrate can be enhanced.

Further, the aqueous coating agent of the first embodiment of the invention can lessen the occurrence of harmful substances at the time of disposal.

Gas Barrier Film

The gas barrier film of a second embodiment of the invention includes a base film made of a plastic material and a film layer formed on one or opposite surfaces of the base film and formed of major constituents including aqueous polyurethane resin (A), water-soluble polymer (B) and inorganic layered mineral (C) wherein ratios of the aqueous polyurethane resin (A), water-soluble polymer (B) and inorganic layered mineral (C) present in the film are within the following ranges of 50-80 mass % of the aqueous polyurethane resin (A),
5-20 mass % of the water-soluble polymer (B), and
10-30 mass % of the inorganic layered mineral (C).

If the aqueous polyurethane resin (A) is less than 50 mass %, adhesion between the film layer and a base film, water resistance, moisture resistance and film cohesive strength become insufficient. On the other hand, when the aqueous polyurethane resin exceeds 80 mass % in amount, the gas barrier properties of the film lower.

When the water-soluble polymer (B) is less than 5 mass %, cohesive strength for use as a film lowers. On the other hand, when the water-soluble polymer (B) exceeds 20 mass %, gas barrier properties of the film lower in an atmosphere of high humidity.

When the inorganic layered mineral (C) is less than 10 mass %, satisfactory gas barrier properties of the film cannot be obtained. On the other hand, when the inorganic layered-mineral (C) exceeds 30 mass %, adhesion between the film layer and a base film and film cohesive strength lower.

As a base film made of a plastic material, mention is made, for example, of poly C2-10 olefin resins such as polyethylene, polypropylene, propylene-ethylene copolymer and the like, polyester resins such as polyethylene terephthalate, polybutylene terephthalate and the like, aliphatic polyamides such as nylon 6, nylon 66 and the like, polyamide resins including aromatic polyamides such as polymethaxylylene adipamide, vinyl resins such as polystyrene, polyvinyl acetate, ethylene-vinyl acetate copolymer, polyvinyl alcohol, ethylene-vinyl alcohol copolymer and the like, acrylic resins including homo- and copolymers of (meth)acrylic monomers such as polymethyl methacrylate, polyacrylonitrile and the like, and cellophane. These resins may be used singly or in combination of two or more.

For the base film, there are used a single layer film formed of a single resin, or a single-layer or laminated film using a plurality resins. Alternatively, a laminate base wherein these resin are laminated on other types of base substrates (metals, wood, paper ceramics and the like) may also be used.

Of these, there are conveniently used, as a base film, a polyolefin resin film (particularly, a polypropylene film), a polyester resin film (particularly, a polyethylene terephthalate resin film), a polyamide resin film (particularly, a nylon film) and the like.

The base film may be a non-stretched film, or may be uniaxially or biaxially stretched film, and may be one which has undergone a surface treatment (such as a corona discharge treatment), or an anchor coating or undercoating treatment. Alternatively, the base film may be a laminate film wherein a plurality of resins and metals are laminated.

When the base film is subjected to corona treatment or low temperature plasma treatment at a coating side (a side on which a film layer is to be formed), there can be obtained good wettability to the coating agent and adhesion strength to the film layer.

The thickness of the base film is not critical and is appropriately selected depending on the price or use while taking an aptitude as a packaging material and a lamination aptitude with other type of film and is at 3-200 μm in practical applications, preferably at 5-120 μm and more preferably at 10-100 μm.

As necessary, the gas barrier film of the second embodiment of the invention may further have a printing layer, an anchor coat layer, an overcoat layer, a light-shielding layer, an adhesive layer, a heat sealing layer and the like.

The film comprised mainly of aqueous polyurethane resin (A), water-soluble polymer (B) and inorganic layered mineral (C) is formed by coating, on a base substrate, a coating agent containing, at least, aqueous polyurethane resin (A), water-soluble polymer (B) and inorganic layered mineral (C) as major components according to a wet coating method and removing a solvent by drying.

The coating agent used is, for example, such an aqueous coating agent as set out hereinabove.

The wet coating method includes roll coating, gravure coating, reverse coating, die coating, screening printing, spray coating or the like.

Using these wet coating methods, the coating agent is coated onto one or both surfaces of a base film.

For drying the coating agent, there can be used a known drying method including hot air drying, hot roll drying, UV irradiation or the like.

The thickness of the dry film formed on the base substrate may be set depending on intended barrier properties and is preferably at 0.1-5 μm, more preferably at 0.2-2 μm.

If the dry film thickness is less than 0.1 μm, satisfactory gas barrier properties are unlikely to be obtained. On the other hand, the dry film thickness exceeding 5 μm is unfavorable because not only a difficulty is involved in providing a uniform film surface, but also increases in drying load and production cost are brought about.

The gas barrier film of the second embodiment of the invention may further contain a variety of additives within ranges not impairing gas barrier properties and strength adapted for use as packaging laminate film.

Examples of the additive include reactive curing agents such as a polyisocyanate, a carbodimide, an epoxy compound, an oxazolidone compound, an aziridine compound and the like, antioxidants, weathering agents thermal stabilizers, lubricants, crystal nucleating agents, UV absorbing agents, plasticizers, anti-electrostatic agents, colorants, fillers, surfactants, silane coupling agent and the like.

If the gas barrier film of the second embodiment of the invention is laminated with a heat-sealable layer, there can be formed a gas barrier laminate film for packaging which can be hermetically sealed by heat sealing.

A heat-sealable layer can be laminated on the gas barrier film of the second embodiment of the invention by use of a known adhesive based on a polyurethane, a polyester, a polyether or the like according to a known dry lamination method, an extrusion lamination method or the like.

The gas barrier film of the second embodiment of the invention has a film comprised mainly of aqueous polyurethane resin (A), water-soluble polymer (B) and inorganic layered mineral (C). When the solid content ratios thereof are controlled within predetermined ranges, respectively, gas barrier properties in an atmosphere of high humidity becomes excellent along with good adhesion of the film layer to a base substrate and good cohesive force. Thus, when using as a packaging material, the film layer contributes to enhancing product quality retention and can be made use as a variety of packaging materials.

Using the gas barrier film of the second embodiment of the invention, generation of harmful substances can be reduced upon disposal.

A gas barrier laminate of a third embodiment of the invention includes a base film made of a plastic material, a gas barrier layer, a protective layer, an adhesive layer and a heat-sealing layer wherein the gas barrier layer is made of a film which contains, as main constituents, aqueous polyurethane resin (A1) containing a polyurethane resin having an acid group and a polyamine compound, water-soluble polymer (B1) and inorganic layered mineral (C1) wherein formulation ratios of the aqueous polyurethane resin (A1), water-soluble polymer (B1) and inorganic layered mineral (C1) present in the film are with ranges indicated below
aqueous polyurethane resin (A1): 50-80 mass %
water-soluble polymer (B1): 5-20 mass %
inorganic layered mineral (C1): 10-30 mass %.

If the water-soluble polymer (B1) is less than 5 mass %, cohesive strength as a film lowers.

If the inorganic layered mineral (C1) is less than 10 mass %, satisfactory gas barrier properties of the resulting film cannot be obtained. On the other hand, when the inorganic layered mineral (C1) exceeds 20 mass % in amount, the gas barrier properties of the film in an atmosphere of high humidity lowers.

The base film made of a plastic material includes, for example, those films made of poly C2-10 olefin resins such as polyethylene, polypropylene, propylene-ethylene copolymer, polyester resins such as polyethylene terephthalate, polybutylene terephthalate and the like, polyamide resins include aliphatic polyamides such as nylon 6, nylon 66 and the like and aromatic polyamide resins such as polymetaxylene adipamide and the like, vinyl resins such as polystyrene, polyvinyl acetate, ethylene-vinyl acetate copolymer, polyvinyl alcohol, ethylene-vinyl alcohol copolymer and the like, acrylic resins including homopolymers and copolymers of (meth)acrylic monomers such as polymethyl methacrylate, polyacrylonitrile and the like, and cellophane. These resins may be used singly or in combination of two or more.

The base film used include a single-layer film made of a single resin or a single-layer or laminate film made of a plurality of resins. Alternatively, there may be used a laminate base substrate wherein these resins are laminated on other types of base substrates (such as of metals, wood, paper, ceramics and the like).

Of these, preferred base films include polyolefins resin films (particularly, polypropylene film), polyester resin films (particularly, polyethylene terephthalate resin films), polyamide resin films (particularly, nylon films) and the like.

The base film may be either a non-stretched film or a uniaxially or biaxially oriented film, and may be a surface-treated (such as by corona discharge treatment), anchor-coated or undercoated film. Alternatively, the base film may be a laminate film wherein a plurality of resins and metals are laminated.

When the base film is subjected to corona discharge treatment or low temperature plasma treatment at the surface to be coated (a surface on which a film is to be formed), good wettability against a coating agent and good strength of adhesion to a film layer are obtained.

The thickness of the base film is not particularly limited and is appropriately controlled depending on the cost and purpose in use while taking into consideration an aptitude as a packaging material and a lamination aptitude with other type of film. In practice, the thickness is at 3-200 μm, preferably at 5-120 μm and more preferably at 10-100 μm.

The gas barrier layer comprised mainly of aqueous polyurethane resin (A1) containing a polyurethane resin having an acid group and a polyamine compound, water-soluble polymer (B1) and inorganic layered mineral (C1) is formed by coating, onto a base film according to a known wet coating method, a coating agent containing, as main constituents, aqueous polyurethane resin (A1) containing, at least, a polyurethane resin having an acid group and a polyamine compound, water-soluble polymer (B1) and inorganic layered mineral (C1), followed by removal of a solvent component by drying.

The coating agent can be prepared, for example, by dissolving or dispersing the above three constituents formulated at such ratios as indicated above in water or a mixed solution of water/an alcohol.

With the aqueous polyurethane resin (A1) containing a polyurethane resin having an acid group and a polyamine compound, the polyamine compound serving as a crosslinking agent and the acid group of the polyurethane are bound together to form a rigid molecular skeleton thereby developing gas barrier properties unlike ordinary polyurethane resins. The resulting dried film becomes insoluble in water as with the case of ordinary polyurethane resins and results in a gas barrier film with low humidity dependence.

The binding between the polyamine compound and the acid group of the polyurethane resin may be either through an ionic bond (e.g. an ion bond between a tertiary amino group and a carboxyl group) or through a covalent bond (e.g. an amide bond).

Accordingly, the polyamine compound used covers a wide variety of polyamines having two or more basic nitrogen atoms selected from the group consisting of primary amino groups, secondary amino groups and tertiary amino groups.

The water-soluble polymer (B1) means a polymer which is completely dissolved in or can be finely dispersed in water at a normal temperature.

The water-soluble polymer (B1) is not particularly limited in type in so far as it is able to intrude or intercalate between unit crystal layers of the inorganic layered mineral (C1) described hereinafter. Examples include polyvinyl alcohol and derivatives thereof, cellulose derivatives such as carboxymethyl cellulose, hydroxyethyl cellulose and the like, starches such as oxidized starch, etherized starch, dextrin and the like, polyvinylpyrrolidone, polyacrylic acid, polymethacrylic acid or esters, salts and copolymers thereof, copolymerized polyesters having a polar group such as of sulfoisophthalic acid, vinyl polymers such as polyhydroxyethyl methacrylate and copolymers thereof, urethane polymers, or polymers obtained by modifying a functional group, such as a carboxyl group, of those various polymers indicated above, and the like.

At least one of the water-soluble polymer (B1) should preferably be a polyvinyl alcohol polymer or its derivative. More preferably, mention is made of a polyvinyl alcohol resin having a degree of saponification of not less than 95% and a degree of polymerization of 300-2000.

With the polyvinyl alcohol resin, higher degrees of saponification and polymerization leads to poorer hygroscopic swelling properties.

If the degree of saponification of polyvinyl alcohol resin is lower than 95%, satisfactory gas barrier properties are unlikely to be obtained.

If the degree of polymerization of polyvinyl alcohol resin is lower than 300, a lowering of gas barrier properties occurs. On the other hand, when the degree of polyvinyl alcohol resin exceeds 2000, the viscosity of an aqueous coating increases, making it difficult to uniformly mix with other constituents, with the attendant disadvantage that gas barrier properties and adhesion lower, thus being unfavorable.

The inorganic layered mineral (C1) means an inorganic compound wherein very thin unit crystal layers are superposed to form one lamellar particle.

The inorganic layered mineral (C1) is preferably ones which are swollen or cleft in water, of which clay compounds having swellability in water are preferred. More particularly, clay compounds which allow water to be coordinated between very thin unit crystal layers and have the capability of absorption and swelling. In general, they have a layer structure which is formed by binding a layer having a tetrahedral structure of $Si^{4+}$ coordinated to $O^{2-}$ and a layer having a octahedral structure of $Al^{3+}$, $Mg^{2+}$, $Fe^{2+}$, $Fe^{3+}$ or the like to $O^{2-}$ and $OH^-$ at 1:1 or 2:1 and stacking the resulting layers. This clay compound may be either natural or synthetic.

Typical examples of the inorganic layered mineral (C1) include hydrous silicates such as phyllosilicate minerals, kaolinite clay minerals such as halloysite, kaolinite, endellite, dickite, nacrite and the like, antigorite clay minerals such as antigorite, clinochrysotile and the like, smectite clay minerals such as montmorillonite, beidellite, nontronite, saponite, hectorite, sauconite, stevensite and the like, vermiculite clay minerals such as vermiculite, micas or mica clay minerals such as margarite, tetrasililic mica, taeniolite and the like, etc.

These inorganic layered minerals (C1) may be used singly or in combination of two or more.

Of these inorganic layered minerals (C1), smectite clay minerals such as montmorillonite and mica clay minerals such as a water-swellable micas are particularly preferred.

With respect to the size of the inorganic layered mineral (C1), it is preferred that an average particle size is not larger than 10 μm and a thickness is not larger than 500 nm. At least one of the inorganic layered minerals (C1) is preferably a wate-swellable synthetic mica having an average particle size of 1-10 μm and a thickness of 10-100 nm.

When using a water-swellable synthetic mica as inorganic layered mineral (C1), this water-swellable synthetic mica has good compatibility with aqueous polyurethane resin (A1) and water-soluble polymer (B1) and contains a less amount of impurities than natural micas, thus not causing lowering of gas barrier properties and film cohesive force as will be derived from impurities. Since a water-swellable synthetic mica has a fluorine atom in the crystal structure, it contributes to suppressing the humidity dependence of gas barrier properties of the film made of the aqueous coating agent. In addition, the mica has a higher aspect ratio than other types of water-swettable inorganic layer minerals, so that a labyrinth effect works more effectively and this mica contributes to developing good gas barrier properties of the film made, particularly, of an aqueous coating agent.

The coating agent capable of forming the gas barrier layer of the third embodiment of the invention may further contain various types of additives within ranges not impeding the gas barrier properties of a gas barrier laminate and strength as a packaging material.

Examples of the additives include reactive curing agents such as a polyisocyanate, a carbodimide, an epoxy compound, an oxazolidone compound, an aziridine compound and the like, antioxidants, weathering agents, thermal stabilizers, lubricants, crystal nucleating agents, UV absorbing agents, plasticizers, anti-electrostatic agents, colorants, fillers, surfactants, silane coupling agents and the like.

The coating agent for forming the gas barrier layer of the third embodiment of the invention contains a solvent which is made of water as a main constituent and may further contain a solvent capable of dissolution in or uniform mixing with water.

The solvents include, for example, alcohols such as methanol, ethanol, isopropanol and the like, ketones such as acetone, methyl ethyl ketone and the like, ethers such as tetrahydrofuran and the like, cellosolves, carbitols, nitriles such as acetonitrile, and the like.

The coating agent for forming the gas barrier layer in the third embodiment of the invention preferably has a total solid content of not less than 8 mass % and a viscosity of 10-50 mPa-second at 23° C. and more preferably a total solid content of not less than 10 mass % and a viscosity of 10-40 mPa-second at 23° C.

The wet coating method used to form the gas barrier layer of the third embodiment of the invention includes roll coating, gravure coating, reverse coating, die coating, screen printing, spray coating or the like.

The coating agent for forming the gas barrier layer is coated onto one or both surfaces of a base film made of a plastic material and subjected to a known drying method such as hot air drying, hot roll drying, IR irradiation or the like to form a dry film thereby providing a gas barrier layer.

The thickness of the gas barrier layer is set depending on the intended gas barrier properties and is preferably at 0.1-5 μm, more preferably at 0.2-2 μm.

If the thickness of the gas barrier layer is less than 0.1 μm, satisfactory gas barrier properties are unlikely to be obtained. On the other hand, the thickness of the gas barrier properties exceeding 5 μm unfavorably leads to not only a difficulty involved in forming a uniform coating surface, but also an increase in drying load along with an increasing product cost.

The gas barrier laminate of the third embodiment of the invention has a protective layer on the surface of the gas barrier layer. For the formation of the protective layer, a wet coating method can be used as in the formation of the gas barrier layer. It will be noted that when using a multicolor coater, the formation may be carried out by an in-line process with the coating step of the gas barrier layer, or may be made by an in-line process prior to the coating of an adhesive in a lamination step appearing hereinafter.

The materials for the protective layer are not critical in type in so far as they do not act to deteriorate the gas barrier properties and lamination strength of the gas barrier laminate. Examples of the material include polyurethane resins, isocyanate-based resins, polybutadiene resins, polyethyleneimine resins, polyester resins, acrylic polyol resins, epoxy resins, styrene-acryl resins, polyacrylic acid resins, polyamide resins, polysiloxane resins and the like. In view of the fact that inexpensive, commercial materials are widely available and lamination strength can be suppressed from lowering with time, polyurethane, isocyanate, polybutadiene, polyethyleneimine, polyester and acryl-polyol resins are particularly preferred.

With the gas barrier laminate of the third embodiment of the invention, the protective layer is interposed between the gas barrier layer and an adhesive layer, so that the temporal stability of lamination strength is improved. With the case of a laminate having a gas barrier layer made of an inorganic layer compound and a resin, peeling occurs frequently owing to the cohesive breakage of the gas barrier layer. This is assumed for the following reason: when the gas barrier layer is in direct contact with the adhesive layer, the gas barrier layer component and the adhesive component are interacted with each other in the vicinity of the interface of the adhesive of the gas barrier layer to form a layer different in quality from the original gas barrier layer. This causes a change in physical properties such as a coefficient of expansion and a strain is accumulated between the layers with a lapse of time, thereby causing a lowering of lamination strength with time. With the gas barrier laminate of this embodiment, the protective layer serves as a shield between the gas barrier layer and the adhesive layer, so that the formulation of a layer resulting from the interaction between the component of the gas barrier layer and the component of the adhesive can be effectively suppressed. Eventually, while keeping initial lamination strength, the occurrence of a delamination failure can be effectively reduced.

According to further lamination with a heat-sealing resin layer through an adhesive layer, there can be obtained a gas barrier laminate of the third embodiment of the invention. For the heat-sealing resin layer, there can be used films of polyolefins such as low density polyethylene, linear low density polyethylene, medium density polyethylene, polypropylene and the like, copolymerized polyester films, polyacrylonitrile film, vinyl acetate copolymer films, and the like. Polyolefin films are preferred because of excellent low temperature heat sealability and inexpensiveness.

For the laminating method, there can be used a known dry lamination method, extrusion lamination method, non-solvent lamination method and the like.

The adhesives used as an adhesive layer may be selected from a variety of adhesives depending on the manner of lamination. For instance, there can be known adhesives based on polyurethanes, polyesters, polyethers, epoxy resins, polyethyleneimines, polybutadienes and the like.

It is to be noted that the gas barrier laminate of the third embodiment of the invention may, as necessary, have a printing layer, an anchor coating layer, a light-shielding layer and other types of functional layers.

The gas barrier laminate of the third embodiment of the invention is one which has at least a gas barrier layer, a protective layer, an adhesive layer and a heat-sealing resin layer successively laminated on a base film made of a plastic material. The gas barrier layer is a film including, as main constituents, aqueous polyurethane resin (A1) containing a polyurethane resin having an acid group and a polyamine compound, water-soluble polymer (B1) and inorganic layered mineral (C1) wherein the solid content ratios thereof are controlled within predetermined ranges and the protective layer is interposed between the gas barrier layer and the adhesive layer. As a result, the laminate exhibits excellent gas barrier properties in an atmosphere of high humidity and is good at adhesion to a base substrate and cohesive force. Even when it is stored over a long time in an atmosphere of high humidity, the degree of lowering of laminate strength with time is small, so that no delamination failure occurs. When used as a packaging material, the laminate enhances product quality retention over a long time and can be make use as a variety of packaging materials. Additionally, occurrence of harmful substances can be suppressed to a lesser extent.

EXAMPLES

The invention is more particularly described by way of examples and comparative examples. The invention should not be construed as limited to the following examples.

Preparatory Example 1

45.5 g of mXDI (metaxylene diisocyanate), 93.9 g of hydrogenated XDI (1,3-bis(isocyanate methyl)cyclohexane), 24.8 g of ethylene glycol, 13.4 g of dimethylol propionic acid and 80.2 g of methyl ethyl ketone serving as a solvent were mixed and reacted in an atmosphere of nitrogen at 70° C. for 5 hours to prepare a carboxyl group-containing urethane prepolymer.

Next, this carboxyl group-containing urethane prepolymer solution was neutralized with 9.6 g of triethylamine at 40° C.

This carboxyl group-containing urethane prepolymer solution was dispersed in 624.8 g of water by means of a homo-disper, followed by chain extension reaction with 21.1 g of 2-[(2-aminoethyl)amino]ethanol and distilling off the methyl ethyl ketone to obtain a water-dispersible polyurethane resin having an acid group and having a solid content of 25 mass %, an average particle size of 90 nm and an acid value of 26.9 mg KOH/g.

Next, the polyurethane resin was mixed with γ-(2-aminoethyl)aminopropylmethyldimethoxysilane (amine value: 544 mg OH/g) used as a polyamine compound at a molar ratio between the acid group and the basic nitrogen atom of 1/1 to obtain an aqueous polyurethane resin of Preparatory Example 1.

Preparatory Example 2

In the same manner as in Preparatory Example 1 using the following compound, an aqueous polyurethane resin of Preparatory Example 2.

Polyamine compound obtained by dropwisely mixing 97.1 g of hydrogenated XDI (1,3-bis(isocyanate methyl) cyclohexane) and 93.6 g of dimethylethanolamine, followed by reaction in an atmosphere of nitrogen at 60° C. for 2 hours.

Preparatory Example 3

In the same manner as in Preparatory Example 1 except that the polyurethane resin of Preparatory Example 1 having an acid group was changed to the following compound, thereby obtaining an aqueous polyurethane resin of Preparatory Example 3.

145.7 g of mXDI (1,3-bis(isocyanate methyl)cyclohexane), 24.2 g of ethylene glycol, 14.8 g of dimethylol propionic acid and 83.6 g of acetone serving as a solvent were mixed and reacted in an atmosphere of nitrogen at 55° C. for 6 hours to prepare a carboxyl group-containing urethane prepolymer solution.

Next, this carboxyl group-containing urethane prepolymer solution was neutralized with 10.6 g of triethylamine at 40° C.

278.9 g of this carboxyl group-containing urethane prepolymer solution was dispersed in 655.8 g of water by means of a homo-disper, followed by chain extension reaction with 23.4 g of 2-[(2-aminoethyl)amino]ethanol and distilling off the acetone to obtain a water dispersible type polyurethane resin having an acid group and having a solid content of 25 mass %, an average particle size of 110 nm and an acid value of 28.2 mg KOH/g.

Examples 1-21

There were used, as aqueous polyurethane resin (A) containing a polyurethane resin having an acid group and a polyamine compound (which may be hereinafter referred to as component (A)), the aqueous polyurethane resins of Preparatory Examples 1-3, polyurethane dispersion Takelac WPB-341, manufactured by Mitsui Chemicals, Inc., and polyurethane dispersion Takelac WPB-363, made by Mitsui Chemicals, Inc.

For water-soluble polymer (B) (which may be hereinafter referred to as component (B)), five types of polyvinyl alcohol resins indicated below and carboxymethyl cellulose (CMC) were used.

Poval PVA-103, manufactured by Kuraray Co., Ltd. (with a degree of saponification of 98-99% and a degree of polymerization of 300)

Poval PVA-110, manufactured by Kuraray Co., Ltd. (with a degree of saponification of 98-99% and a degree of polymerization of 1000)

Poval PVA-117, manufactured by Kuraray Co., Ltd. (with a degree of saponification of 98-99% and a degree of polymerization of 1700)

Poval PVA-124, manufactured by Kuraray Co., Ltd. (with a degree of saponification of 98-99% and a degree of polymerization of 2400)

Poval PVA-210, manufactured by Kuraray Co., Ltd. (with a degree of saponification of 98-99% and a degree of polymerization of 1000)

Two types of water-swelling synthetic mica (Somasif MEB-3, manufactured by Co-op Chemical Co., Ltd., and NTS-5, manufactured by Topy Industries Limited), sodium hectorite (NHT-Sol B2, manufactured by Topy Industries Limited) and purified montmorillonite (Kunipia, manufactured by Kunimine Industries Co., Ltd.).

Components (A), (B) and (C) were formulated at solid content ratios indicated in Tables 1 and 2, heated and mixed at 80° C., followed by cooling down to room temperature. The mixture of the components A-C were diluted with ion exchanged water and isopropanol so that 10 mass % of the solvent was made of isopropanol and final solid concentrations were set at those indicated in Table 1 and 2, respectively. Immediately before coating, a curing agent (water-soluble polyisocyanate TAKENATE WD-725, manufactured by Mitsui Chemicals, Inc.) indicated in Tables 1 and 2 was added to thereby preparing aqueous coating agents of Examples 1-21.

Comparative Examples 1-7

Instead of the aqueous polyurethane resin (A) (which may be hereinafter referred to as component (A)) containing a polyurethane resin having an acid group and a polyamine compound, there were used, as an ordinary water-soluble polyurethane resin, polyester polyurethane aqueous solution Hydra HW350, manufactured by DIC Inc., and polyether polyurethane resin aqueous solution Estolan H-38, made by Daiichi Kogyo Seiyaku K.K.

As water-soluble polymer (B) (which may be hereinafter referred to as component (B)), there was used polyvinyl alcohol resin Poval PVA-124 (with a degree of saponification of 98-99% and a degree of polymerization of 2400), manufactured by Kurarey Co., Ltd.

As inorganic layered mineral (C) (which may be hereinafter referred to as component (C)), there were used a water-swellable synthetic mica (NTS-5, manufactured by Topy Industries Limited) and purified montmorillonite (Kunipia, manufactured by Kunimine Industries Co., Ltd.).

The components (A), (B) and (C) were formulated at solid content ratios indicated in Table 3 and heated and mixed at 80° C., followed by cooling down to room temperature. The mixture of the components A-C was diluted with ion exchanged water and isopropanol so that 10 mass % of the solvent was made of isopropanol and final solid concentrations were set at those indicated in Table 3, respectively. Immediately before coating, a curing agent (methylolated melamine MW-12LF, manufactured by Sanwa Chemical Co., Ltd.) indicated in Table 3 was added to only in Comparative Example 3 thereby preparing aqueous coating agents of Comparative Examples 1-7.

Comparative Examples 8-21

As aqueous polyurethane resin (A) (which may be hereinafter referred to as component (A)) containing a polyurethane resin having an acid group and a polyamine compound, there were used the aqueous polyurethane resins of Preparatory Examples 1-3 and polyurethane dispersion Takelac WPB-341, manufactured by Mitsui Chemicals Co., Ltd.

As water-soluble polymer (B) (which may be hereinafter referred to as component (B)), there was used polyvinyl alcohol resin Poval PVA-110 (with a degree of saponification of 98-99% and a degree of polymerization of 1000), manufactured by Kurarey Co., Ltd., polyvinyl alcohol resin Poval PVA-124 (with a degree of saponification of 98-99% and a degree of polymerization of 2400), manufactured by Kurarey Co., Ltd., or polyvinyl alcohol resin Poval PVA-102 (with a degree of saponification of 98-99% and a degree of polymerization of 200), manufactured by Kurarey Co., Ltd., As inorganic layered mineral (C) (which may be hereinafter referred to as component (C)), there were used a water-swellable synthetic mica ((Somasif MEB-3, manufactured by Co-op Chemical Co., Ltd.) and purified montmorillonite (Kunipia, manufactured by Kunimine Industries Co., Ltd.).

The components (A), (B) and (C) were formulated at solid content ratios indicated in Tables 3, 4 and heated and mixed at 80° C., followed by cooling down to room temperature. The mixture was diluted with ion exchanged water and isopropanol so that 10 mass % of the solvent was made of isopropanol and final solid concentrations were set at those indicated in Tables 3, 4, respectively. Immediately before coating, a curing agent (water-soluble polyisocyanate Takelac, manufactured by Mitsui Chemicals, Inc.) indicated in Tables 3, 4 was added to thereby preparing aqueous coating agents of Comparative Examples 7-21.

The aqueous coating agents of Examples 1-21 and Comparative Examples 1-21 were coated, by use of a gravure coater, onto a corona-treated surface of biaxially stretched polyethylene terephthalate film P-60 (with a thickness of 12 μm, PET), manufactured by Toray Industries, Inc., or biaxially stretched polypropylene film U-1 (with a thickness of 20 mm, OPP), manufactured by Mitsui Chemicals Tohcello Inc., in dry coating amounts indicated in Tables 1-4, followed by passing through an oven of 90° C. for 10 seconds for drying to obtain gas barrier films of Examples 1-21 and Comparative Examples 1-21.

Evaluation (Measurement of Viscosity)

The aqueous coating agents of Examples 1-21 and Comparative Examples 1-21 were subjected to measurement of viscosity at 23° C. using a vibration-type viscometer. The results are shown in Tables 1-4.

(Oxygen Gas Barrier Properties)

Using an oxygen gas transmission rate tester (OXTRAN-2/20, made by MOCON Inc.), the gas barrier films of Examples 1-21 and Comparative Examples 1-21 were subjected to measurement of oxygen gas barrier property in an atmosphere of 20° C. and 80% R.H. The results are shown in Tables 1-4.

(Laminate Strength)

A 30 μm thick non-stretched propylene film (CPP GLC, manufactured by Mitsui Chemicals Tohcello Inc.) was laminated on a coating surface of each of the gas barrier films of Examples 1-21 and Comparative Examples 1-21 according to a dry lamination process via a polyester urethane adhesive (Takelac A-525, manufactured by Mitsui Chemicals Inc./ Takenate A-52, manufactured by Mitsui Chemicals Inc.), followed by aging at 40° C. for 48 hours to obtain laminate films.

The respective laminate films were cut into 15 mm wide rectangular pieces, followed by measurement of lamination strength by subjecting to 90 degree peeling of the gas barrier film at a rate of 300 mm/minute by use of a tensile tester Tensilon. The results are shown in Tables 1-4.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| A | Component (A) | Preparatory Example 1 | Preparatory Example 2 | Preparatory Example 3 | WBP-341 | WBP-341 | WBP-341 | WBP-341 | WBP-341 | WBP-341 | WBP-341 |
| | Formulation ratio (mass %) | 60 | 60 | 60 | 50 | 50 | 60 | 65 | 55 | 60 | 75 |
| B | Component (B) | PVA110 | PVA110 | PVA110 | PVA103 | PVA110 | PVA117 | PVA124 | PVA210 | CMC | 0 |
| | Formulation ratio (mass %) | 10 | 10 | 10 | 10 | 20 | 20 | 10 | 5 | 15 | 5 |
| C | Component (C) | Somasif MEB-3 | Somasif MEB-3 | Somasif MEB-3 | Somasif MEB-3 | Somasif MEB-3 | Somasif MEB-3 | Somasif MEB-3 | Somasif MEB-3 | Somasif MEB-3 | NTS-5 |
| | Formulation ratio (mass %) | 20 | 20 | 20 | 30 | 20 | 10 | 15 | 30 | 15 | 10 |
| | Curing agent | WD-725 | WD-725 | WD-725 | WD-725 | WD-725 | WD-725 | WD-725 | WD-725 | WD-725 | WD-725 |
| | Formulation ratio (mass %) | 10 | 10 | 10 | 10 | 10 | 10 | 10 | 10 | 10 | 10 |
| | Solid concentration (%) | 8 | 8 | 8 | 10 | 8 | 8 | 8 | 8 | 8 | 8 |

TABLE 1-continued

| | Example | | | | | | | | | |
|---|---|---|---|---|---|---|---|---|---|---|
| | 1 | 2 | 3 | 4 | 5 | 6 | 7 | 8 | 9 | 10 |
| Viscosity (mPa-second) | 22 | 20 | 21 | 15 | 30 | 38 | 48 | 14 | 26 | 28 |
| Base film | PET | PET | PET | PET | OPP | OPP | OPP | PET | PET | PET |
| Dry coating amount (g/m$^2$) | 1 | 1 | 1 | 1 | 1 | 1 | 1 | 1 | 1 | 1 |
| Oxygen transmission rate (cc/cm$^2$-day) | 2 | 3 | 3 | 5 | 2 | 4 | 2 | 4 | 3 | 3 |
| Lamination strength (N/15 mm) | 1.2 | 1.2 | 1.3 | 1.3 | 1.4 | 1.6 | 1.4 | 1.2 | 1.5 | 1.4 |

TABLE 2

| | | Example | | | | | | | | | | |
|---|---|---|---|---|---|---|---|---|---|---|---|---|
| | | 11 | 12 | 13 | 14 | 15 | 16 | 17 | 18 | 19 | 20 | 21 |
| A | Component (A) | WBP-341 | WBP-341 | WBP-341 | WBP-341 | WBP-341 | WBP-363 | WBP-363 | WBP-363 | WBP-363 | WBP-363 | WBP-363 |
| | Formulation ratio (mass %) | 75 | 60 | 60 | 50 | 50 | 60 | 60 | 65 | 65 | 60 | 60 |
| B | Component (B) | CMC | PVA110 | CMC | PVA110 | CMC | PVA110 | CMC | PVA110 | CMC | PVA110 | CMC |
| | Formulation ratio (mass %) | 5 | 15 | 15 | 15 | 15 | 10 | 10 | 10 | 10 | 10 | 10 |
| C | Component (C) | NTS-5 | NHT-sol B2 | NHT-sol B2 | Kunipia F | Kunipia F | Somasif MEB-3 | Somasif MEB-3 | NST-5 | NS-5 | Kunipia F | Kunipia F |
| | Formulation ratio (mass %) | 10 | 15 | 15 | 25 | 25 | 20 | 20 | 15 | 15 | 20 | 20 |
| | Curing agent | WD-725 | WD-725 | WD-725 | WD-725 | WD-725 | WD-725 | WD-725 | WD-725 | WD-725 | WD-725 | WD-725 |
| | Formulation ratio (mass %) | 10 | 10 | 10 | 10 | 10 | 10 | 10 | 10 | 10 | 10 | 10 |
| | Solid concentration (%) | 8 | 8 | 8 | 8 | 8 | 8 | 8 | 8 | 8 | 8 | 8 |
| | Viscosity (mPa-second) | 31 | 35 | 36 | 25 | 25 | 29 | 27 | 20 | 21 | 21 | 18 |
| | Base film | PET | PET | PET | PET | PET | OPP | OPP | OPP | OPP | OPP | OPP |
| | Dry coating amount (g/m$^2$) | 1 | 1 | 1 | 1 | 1 | 1 | 1 | 1 | 1 | 1 | 1 |
| | Oxygen transmission rate (cc/cm$^2$-day) | 4 | 2 | 4 | 4 | 5 | 2 | 2 | 2 | 3 | 4 | 4 |
| | Lamination strength (N/15 mm) | 1.3 | 1.5 | 1.5 | 1.8 | 1.7 | 1.2 | 1.3 | 1.3 | 1.3 | 1.5 | 1.4 |

TABLE 3

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| A | Component (A) | HW350 | H-38 | HW350 | HW350 | HW350 | HW350 | HW350 | Preparatory Example 1 | Preparatory Example 2 | Preparatory Example 3 |
| | Formulation ratio (mass %) | C10 | 18 | 17 | 15 | 8 | 10 | 10 | 100 | 100 | 100 |
| B | Component (B) | PVA124 | PVA124 | PVA124 | PVA124 | PVA124 | PVA124 | PVA124 | | | |
| | Formulation ratio (mass %) | 40 | 42 | 40 | 50 | 50 | 40 | 40 | 0 | 0 | 0 |
| C | Component (C) | Kunipia F | Kunipia F | Kunipia F | NTS-5 | NTS-5 | Kunipia F | Kunipia F | | | |
| | Formulation ratio (mass %) | 50 | 40 | 40 | 35 | 42 | 50 | 50 | 0 | 0 | 0 |
| | Curing agent | | | MW-12LF | | | | | | | |
| | Formulation ratio (mass %) | 0 | 0 | 3 | 0 | 0 | 0 | 0 | 0 | 0 | 0 |
| | Solid concentration (%) | 2.5 | 2.5 | 2.5 | 2.5 | 2.5 | 2.5 | 4 | 20 | 20 | 20 |

TABLE 3-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| Viscosity (mPa-second) | 36 | 28 | 25 | 32 | 35 | 30 | 200 | 12 | 10 | 11 |
| Base film | PET | PET | PET | OPP | PET | OPP | OPP | PET | PET | PET |
| Dry coating amount (g/m$^2$) | 0.5 | 0.5 | 0.5 | 0.5 | 0.5 | 0.5 | 1 | 5 | 5 | 5 |
| Oxygen transmission rate (cc/cm$^2$-day) | 12 | 15 | 15 | 11 | 9 | 14 | >100 | 17 | 20 | 23 |
| Lamination strength (N/15 mm) | 1.5 | 1.1 | 1.4 | 1.2 | 1.4 | 1.2 | 1.5 | 2.1 | 2.2 | 2.3 |

TABLE 4

| | | Comparative Example | | | | | | | | | | |
|---|---|---|---|---|---|---|---|---|---|---|---|---|
| | | 11 | 12 | 13 | 14 | 15 | 16 | 17 | 18 | 19 | 20 | 21 |
| A | Component (A) | Preparatory Example 1 | Preparatory Example 2 | Preparatory Example 3 | WBP-341 | WBP-341 | WBP-341 | WBP-341 | WBP-341 | WBP-341 | WBP-341 | WBP-341 |
| | Formulation ratio (mass %) | 70 | 70 | 70 | 90 | 57 | 70 | 45 | 60 | 45 | 45 | 50 |
| B | Component (B) | | | | | PVA110 | PVA110 | PVA110 | | PV110 | PV124 | PV102 |
| | Formulation ratio (mass %) | 0 | 0 | 0 | 0 | 3 | 15 | 25 | 0 | 10 | 20 | 10 |
| C | Component (C) | Somasif MEB-3 | Somasif MEB-3 | Somasif MEB-3 | | Kunipia F | Kunipia F | Kunipia F | Somasif MEB-3 | Somasif MEB-3 | Somasif MEB-3 | Kunipia F |
| | Formulation ratio (mass %) | 20 | 20 | 20 | 0 | 30 | 5 | 20 | 30 | 35 | 25 | 30 |
| | Curing agent | WD-725 | WD-725 | WD-725 | WD-725 | WD-725 | WD-725 | WD-725 | WD-725 | WD-725 | WD-725 | WD-725 |
| | Formulation ratio (mass %) | 10 | 10 | 10 | 10 | 10 | 10 | 10 | 10 | 10 | 10 | 10 |
| | Solid concentration (%) | 8 | 8 | 8 | 15 | 8 | 8 | 8 | 8 | 8 | 8 | 8 |
| | Viscosity (mPa-second) | 30 | 26 | 27 | 9 | 33 | 25 | 55 | 18 | 50 | 500 | 15 |
| | Base film | PET | PET | PET | OPP | OPP | OPP | OPP | OPP | OPP | OPP | OPP |
| | Dry coating amount (g/m$^2$) | 5 | 5 | 5 | 2 | 1 | 1 | 1 | 1 | 1 | 1 | 1 |
| | Oxygen transmission rate (cc/cm$^2$-day) | 3 | 3 | 5 | 30 | 6 | 20 | 10 | 2 | 2 | >100 | 14 |
| | Lamination strength (N/15 mm) | 0.3 | 0.3 | 0.3 | 2.2 | 0.8 | 1.9 | 1.7 | 0.3 | 0.4 | 1.5 | 1.2 |

From the results of Table 3, the aqueous coating agents of Comparative Examples 1-6 were so low in solid concentration that when the dry coating amount was increased, the drying became insufficient, not resulting in uniform film formation. In addition, the values of the oxygen transmission rate in an atmosphere of 20° C. and 80% R.H. were not less than 5 cc/m$^2$-day and thus, it could not be said that satisfactory oxygen barrier properties were ensured. From the results of Table 3, it will be seen that although the aqueous coating agent of Comparative Example 7 was prepared by increasing the solid concentration to 4 mass %, the resulting viscosity was so high that coatability deteriorated, which in turn lead to a lowering of the oxygen gas barrier property. In view of the results of Tables 3 and 4, the aqueous coating agents of Comparative Examples 8-10 were so low in viscosity that high concentration coating (high coating amount) was possible, but with poor oxygen gas barrier property.

With Comparative Examples 11-13 wherein inorganic layered mineral (C) was added to the above agents, although the oxygen gas barrier property was improved, lamination strength significantly lowered.

From the results of Table 4, the gas barrier films of Comparative Examples 14-21 were poor in either oxygen gas barrier property in an atmosphere of 20° C. and R.H., or lamination strength and thus, a good balance between the both could not be achieved.

On the other hand, it was confirmed from the results of Tables 1 and 2 that the aqueous coating agents of Examples 1-21 were all good at gravure coatability. The gas barrier films of Examples 1-21 had an oxygen transmission rate of not larger than 5 cc/m$^2$-day in an atmosphere of 20° C. and 80% R.H., and a lamination strength of not less than 1.0 N/15 mm, thus ensuring characteristics suited for application as a gas barrier packaging material.

The third embodiment of the invention are more particularly described by way of examples and comparative examples.

Preparatory Example of Polyurethane Resin 439.1 g of hydrogenated XDI (1,4-bis(isocyanate methyl) cyclohexane), 61.5 g of ethylene glycol, 35.4 g of dimethylol propionic acid and 140 g of acetonitrile were mixed and reacted in an atmosphere of nitrogen at 70° C. for 3 hours to prepare a carboxyl group-containing urethane prepolymer solution.

Next, this carboxyl group-containing urethane prepolymer solution was neutralized with 24.0 g of triethylamine at 50° C.

267.9 g of the carboxyl group-containing urethane prepolymer solution was dispersed in 750 g of water by means of a homo-disper, followed by subjecting to chain extension reaction with 35.7 go of 2-[(2-aminoethyl)amino]ethanol and distilling off the acetonitrile to obtain an aqueous polyurethane resin having a solid content of 25 mass % and an average particle size of 90 nm and containing the acid group-containing polyurethane resin and polyamine compound.

Coating Agent Preparatory Examples 101-111

The aqueous polyurethane resin of the Preparatory Example of Polyurethane Resin (which is referred to as "Preparatory Example A1" in the following tables) and a polyurethane dispersion Takelac WPB-341, manufactured by Mitsui Chemicals Inc., were, respectively, provided as an aqueous polyurethane resin (A1) (which may be sometimes referred to as component (A1) hereinafter) containing an acid group-containing polyurethane resin and a polyamine compound. For comparison, polyester polyurethane resin aqueous solution Hydrant HW350, manufactured by DIC corporation, which is an ordinary water-soluble polyurethane resin, was used.

The following five types of polyvinyl alcohol resins were used as water-soluble polymer (B1) (which may be sometimes referred to as "component B1" hereinafter).

Poval PVA-103 (with a degree of saponification of 98-99% and a degree of polymerization of 300), manufactured by Kurarey Co., Ltd.

Poval PVA-110 (with a degree of saponification of 98-99% and a degree of polymerization of 1000), manufactured by Kurarey Co., Ltd.

Poval PVA-117 (with a degree of saponification of 98-99% and a degree of polymerization of 1700), manufactured by Kurarey Co., Ltd.

Poval PVA-124 (with a degree of saponification of 98-99% and a degree of polymerization of 2400), manufactured by Kurarey Co., Ltd.

Poval PVA-210 (with a degree of saponification of 88-89% and a degree of polymerization of 1000), manufactured by Kurarey Co., Ltd.

The inorganic layered mineral (C1) (which may be sometimes referred to as "component (C1) hereinafter) included two types of water-swellable synthetic micas (Somasif MEB-3, manufactured by Co-op Chemical Co., Ltd., and NTS-5, manufactured by Topy Industries Limited) and purified montmorillonite (Kunipia-F, manufactured by Kunimine Industries Co., Ltd.).

Component (A1), component (B1) and component (C1 were formulated at solid content ratios indicated in Tables 5-8 and mixed under heating at 80° C., followed by cooling down to room temperature. The mixture of components A1-C1 was diluted with ion-exchanged water and isopropanol so that 10 mass % of the solvent was made of isopropanol and final solid concentrations were set at those indicated in Tables 5-8, respectively. Immediately before coating, curing agents indicated in Tables 5-8 (i.e. water-soluble polyisocyanate Takenate WD-725, manufactured by Mitsui Chemicals Inc., and N-methylolated melamine MW-12LF, manufactured by Sanwa Chemical Co., Ltd.) were added thereby preparing aqueous coating agents of Coating Agent Preparatory Examples 101-111.

The aqueous coating agents of Coating Agent Preparatory Examples 101-111 were each coated, by use of a gravure coater, onto a corona-treated surface of biaxially stretched polypropylene film U-1 (20 μm in thickness, OPP) manufactured by Mitsui Chemicals Tohcello, Inc., and dried by passage through an oven of 90° C. for 10 seconds to obtain a gas barrier film having a 1.0 μm thick gas barrier layer formed on the OPP film.

Examples 101-116, Comparative Examples 101-105

Using a gravure coater, six types of coating agents for the formation of protective layers indicated below were each coated onto the gas barrier layer of the individual gas barrier film and dried by passage through an oven of 90° C. for 10 seconds to form a 0.3 μm protective layer.

(Polyurethane-based) Hydrant HW350 of DIC Co., Ltd./MW-12LF of Sanwa Chemical Co., Ltd./ion-exchanged water/isopropanol=10/2/78/100 solution (Isocyanate-based) Takenate A-65 of Mitsui Chemicals Inc./ethyl acetate=9/1 solution (Polybutadiene-based) EL451 of Toyo-Morton, Ltd./methanol=1/1 solution (Polyethyleneimine-based) Epomin P-1000 of Nippon Shokubai Co., Ltd./methanol=1/6 solution (Polyester-based) Vylon 50AS of Nisshinbo Holdings Inc./Coronate L of Nippon Polyurethane Industry Co., Ltd./ethyl acetate=10/1/60 solution (Acrylic polyol-based) Dianal LR209 of Mitsubishi Rayon Co., Ltd./Coronate L of Nippon Polyurethane Industry Co., Ltd./ethyl acetate=10/1/60 solution Moreover, a 30 μm thick non-stretched polypropylene film (CPP GLC, manufactured by Mitsui Chemicals Tohcello, Inc., was laminated, by a dry lamination process, on the gas barrier layer/protective layer-formed side via a polyester urethane adhesive (Takelac A-525 of Mitsui Chemicals, Inc./Takenate A-52 of Mitsui Chemicals, Inc.), followed by aging at 40° C. for 48 hours to obtain gas barrier laminates of Examples 101-116 and Comparative Examples 101-105 indicated in Tables 5-8.

Comparative Examples 106-116

In the same manner as in the above examples, lamination was carried out without forming a protective layer on the gas barrier layer of the gas barrier film to obtain gas barrier laminates of Comparative Examples 106-116.

Evaluation (Oxygen Gas Barrier Property)

Using an oxygen transmission rate tester (OXTRAN-2/20, manufactured by Mocon Inc.), the gas barrier laminates of Examples 101-106 and Comparative Examples 101-116 were subjected to measurement of oxygen gas transmission rate in an atmosphere of 20° C. and 80% R.H., to evaluate an oxygen gas barrier property.

(Lamination Strength)

The gas barrier laminates of Examples 101-106 and Comparative Examples 101-116 were cut into 15 mm wide rectangular pieces and the gas barrier film was subjected to 90 degrees peeling by means of a tensile testing machine Tensilon at a rate of 300 mm/minute to measure laminate strength. Moreover, the gas barrier laminates of Examples 101-106 and Comparative Examples 101-116 were kept in a constant temperature and humidity chamber at 40° C. ad 75% R.H., and removed from the constant temperature chamber after one and three months, respectively. The laminate strength was similarly measured after certain lapses of time. The results are shown in Tables 5-8.

TABLE 5

| | | | | | Example | | | | |
|---|---|---|---|---|---|---|---|---|---|
| | | 101 | 102 | 103 | 104 | 105 | 106 | 107 | 108 |
| Coating agent | | Preparatory Example 101 | Preparatory Example 102 | Preparatory Example 103 | Preparatory Example 104 | Preparatory Example 105 | Preparatory Example 106 | Preparatory Example 101 | Preparatory Example 101 |
| Component (A1) | | Preparatory Example A1 | WPB-341 | WPB-341 | WPB-341 | WPB-341 | WPB-341 | Preparatory Example A1 | Preparatory Example A1 |
| Formulation ratio | | 60% | 50% | 50% | 55% | 75% | 50% | 60% | 60% |
| Component (B1) | | PVA110 | PVA103 | PVA110 | PVA210 | PVA124 | PVA117 | PVA110 | PVA110 |
| Formulation ratio | | 10% | 10% | 20% | 5% | 5% | 15% | 10% | 10% |
| Component (C1) | | MEB-3 | MEB-3 | MEB-3 | MEB-3 | NTS-5 | Kunipia F | MEB-3 | MEB-3 |
| Formulation ratio | | 20% | 30% | 20% | 30% | 10% | 25% | 20% | 20% |
| Curing Agent | | WD-725 | WD-725 | WD-725 | WD-725 | WD-725 | WD-725 | WD-725 | WD-725 |
| Formulation ratio | | 10% | 10% | 10% | 10% | 10% | 10% | 10% | 10% |
| Solid concentration (%) | | 8 | 10 | 8 | 8 | 8 | 8 | 8 | 8 |
| Protective layer | | Poly-urethane | Poly-urethane | Poly-Urethane | Poly-urethane | Poly-urethane | Poly-urethane | Iso-cyanate | Poly-butadiene |
| Oxygen transmission rate ($cm^3/(m^2$-24 hrs-atm.)) | | 2 | 2 | 3 | 2 | 4 | 5 | 2 | 2 |
| Laminate Strength (N/15 mm) | Initial stage | 1.3 | 1.2 | 1.4 | 1.2 | 1.4 | 1.6 | 1.1 | 1.0 |
| | 40° C., 75%, one month | 0.8 | 0.7 | 1.0 | 0.7 | 1.0 | 1.5 | 0.8 | 0.9 |
| | 40° C., 75%, 3 months | 0.7 | 0.7 | 0.9 | 0.6 | 1.0 | 1.3 | 0.7 | 0.9 |

TABLE 6

| | | | | | Example | | | | |
|---|---|---|---|---|---|---|---|---|---|
| | | 109 | 110 | 111 | 112 | 113 | 114 | 115 | 116 |
| Coating agent | | Preparatory Example 101 | Preparatory Example 101 | Preparatory Example 101 | Preparatory Example 103 | Preparatory Example 103 | Preparatory Example 103 | Preparatory Example 103 | Preparatory Example 103 |
| Component (A1) | | Preparatory Example A1 | Preparatory Example A1 | Preparatory Example A1 | WPB-341 | WPB-341 | WPB-341 | WPB-341 | WPB-341 |
| Formulation ratio | | 60% | 60% | 60% | 50% | 50% | 50% | 50% | 50% |
| Component (B1) | | PVA110 | PVA110 | PVA110 | PVA110 | PVA110 | PVA110 | PVA110 | PVA110 |
| Formulation ratio | | 10% | 10% | 10% | 20% | 20% | 20% | 20% | 20% |
| Component (C1) | | MEB-3 | MEB-3 | MEB-3 | MEB-3 | MEB-3 | MEB-3 | MEB-3 | MEB-3 |
| Formulation ratio | | 20% | 20% | 20% | 20% | 20% | 20% | 20% | 20% |
| Curing Agent | | WD-725 | WD-725 | WD-725 | WD-725 | WD-725 | WD-725 | WD-725 | WD-725 |
| Formulation ratio | | 10% | 10% | 10% | 10% | 10% | 10% | 10% | 10% |
| Solid concentration (%) | | 8 | 8 | 8 | 8 | 8 | 8 | 8 | 8 |
| Protective layer | | Poly-ethylene-imine | Poly-ester | Acrylic polyol | Iso-cyanate | Poly-butadiene | Poly-ethylene-imine | Poly-ester | Acrylic polyol |
| Oxygen transmission rate ($cm^3/(m^2$-24 hrs-atm.)) | | 2 | 2 | 2 | 3 | 3 | 3 | 3 | 3 |
| Laminate Strength (N/15 mm) | Initial | 1.0 | 1.2 | 1.2 | 1.2 | 1.2 | 1.0 | 1.3 | 1.2 |
| | 40° C., 75%, one month | 0.8 | 0.8 | 0.9 | 1.0 | 1.0 | 0.9 | 1.0 | 1.0 |
| | 40° C., 75%, 3 months | 0.9 | 0.7 | 0.7 | 0.9 | 0.9 | 0.7 | 0.9 | 0.9 |

TABLE 7

| | Comparative Example | | | | | | | |
|---|---|---|---|---|---|---|---|---|
| | 101 | 102 | 103 | 104 | 105 | 106 | 107 | 108 |
| Coating agent | Preparatory Example 107 | Preparatory Example 108 | Preparatory Example 109 | Preparatory Example 110 | Preparatory Example 111 | Preparatory Example 107 | Preparatory Example 108 | Preparatory Example 109 |
| Component (A1) | HW350 | Preparatory Example A1 | WPB-341 | WPB-341 | WPB-341 | HW350 | Preparatory Example A1 | WPB-341 |
| Formulation ratio | 17% | 70% | 70% | 45% | 45% | 17% | 70% | 70% |
| Component (B1) | PVA124 | | PVA110 | PVA110 | PVA110 | PVA124 | | PVA110 |
| Formulation ratio | 40% | 0% | 15% | 25% | 10% | 40% | 0% | 15% |
| Component (C1) | NTS-5 | MEB-3 | Kunipia F | Kunipia F | MEB-3 | NTS-5 | MEB-3 | Kunipia F |
| Formulation ratio | 40% | 20% | 5% | 20% | 35% | 40% | 20% | 5% |
| Curing Agent | MW-12LF | WD-725 | WD-725 | WD-725 | WD-725 | MW-12LF | WD-725 | WD-725 |
| Formulation ratio | 3% | 10% | 10% | 10% | 10% | 3% | 10% | 10% |
| Solid concentration (%) | 2.5 | 8 | 8 | 8 | 8 | 2.5 | 8 | 8 |
| Protective layer | Polyurethane | Polyurethane | Polyurethane | Polyurethane | Polyurethane | nil | nil | nil |
| Oxygen transmission rate ($cm^3/(m^2$-24 hrs-atm.)) | 1.5 | 3 | 20 | 10 | 2 | 15 | 3 | 20 |
| Laminate Strength (N/15 mm) Initial | 1.4 | 0.3 | 1.7 | 1.5 | 0.5 | 1.4 | 0.3 | 1.7 |
| 40° C., 75%, one month | 1.2 | 0.2 | 1.5 | 1.2 | 0.4 | 1.0 | 0.2 | 1.2 |
| 40° C., 75%, 3 months | 1.1 | 0.2 | 1.4 | 1.2 | 0.4 | 0.8 | 0.2 | 0.9 |

TABLE 8

| | Comparative Example | | | | | | | |
|---|---|---|---|---|---|---|---|---|
| | 109 | 110 | 111 | 112 | 113 | 114 | 115 | 116 |
| Coating agent | Preparatory Example 110 | Preparatory Example 111 | Preparatory Example 101 | Preparatory Example 102 | Preparatory Example 103 | Preparatory Example 104 | Preparatory Example 105 | Preparatory Example 106 |
| Component (A1) | WPB-341 | WPB-341 | Preparatory Example A1 | WPB-341 | WPB-341 | WPB-341 | WPB-341 | WPB-341 |
| Formulation ratio | 45% | 45% | 60% | 50% | 50% | 55% | 75% | 50% |
| Component (B1) | PVA110 | PVA110 | PVA110 | PVA103 | PVA110 | PVA210 | PV124 | PVA117 |
| Formulation ratio | 25% | 10% | 10% | 10% | 20% | 5% | 5% | 15% |
| Component (C1) | Kunipia F | MEB-3 | MEB-3 | MEB-3 | MEB-3 | MEB-3 | NTS-5 | Kunipia F |
| Formulation ratio | 20% | 35% | 20% | 30% | 20% | 30% | 10% | 25% |
| Curing Agent | WD-725 | WD-725 | WD-725 | WD-725 | WD-725 | WD-725 | WD-725 | WD-725 |
| Formulation ratio | 10% | 10% | 10% | 10% | 10% | 10% | 10% | 10% |
| Solid concentration (%) | 8 | 8 | 8 | 10 | 8 | 8 | 8 | 8 |
| Protective layer | nil | Nil | nil | nil | nil | nil | nil | nil |
| Oxygen transmission rate ($cm^3/(m^2$-24 hrs-atm.)) | 10 | 2 | 2 | 2 | 3 | 2 | 4 | 5 |
| Laminate Strength (N/15 mm) Initial | 1.5 | 0.6 | 1.2 | 1.1 | 1.2 | 1.0 | 1.4 | 1.6 |
| 40° C., 75%, one month | 1.2 | 0.4 | 0.6 | 0.6 | 0.6 | 0.5 | 0.7 | 0.8 |
| 40° C., 75%, 3 months | 1.0 | 0.4 | 0.4 | 0.3 | 0.4 | 0.3 | 0.4 | 0.4 |

From the results of Tables 7 and 8, it will be seen that all the gas barrier laminates of Comparative Examples 101, 103, 104, 106, 108 and 109 had the values of oxygen transmission rate of not less than 10 $cm^3/(m^2$-24 hrs-atm.) in an atmosphere of 40° C. and 75% R.H. Thus, it could not be said that satisfactory gas barrier properties were ensured.

From the results of Tables 7 and 8, it will be seen that when the gas barrier laminates of Comparative Examples 102, 105, 107 and 110-116 were stored in an atmosphere of 40° C. and 75% R.H., for 3 months, the laminate strength lowered to 0.4 N/15 mm or below. This strength involves the high possibility of causing a delamination failure in the course of distribution as a packaging material and thus, a good balance between the gas barrier properties and the laminate strength with time could not be achieved.

On the other hand, the results of Tables 5 and 6, the gas barrier laminates of Examples 101-116 have components (A1), (B1) and (C1) which are formulated at such solid content ratios as indicated in Tables 5, 6. Thus, the values of oxygen transmission rate in an atmosphere of 20° C. and 80% R.H., are at not larger than 5 $cm^3/(m^2$-24 hrs-atm.) and they have a good oxygen gas barrier property.

The results of Tables 5 and 6 revealed that after storage in an atmosphere of 40° C. and 75% R.H., for 3 months, the gas barrier laminates of Examples 101-116 each had a laminate strength of not less than 0.6 N/15 mm, ensuring strength sufficient for use as a packaging material under ordinary distribution conditions.

Packaging materials are used for foods and medicinal products and may be provided with a gas barrier layer made of a material having gas barrier properties. The gas barrier layer may be formed on a base substrate such as a film or paper according to a sputtering or vacuum deposition method, or a wet coating method or a printing method. The gas barrier layer may include a metal foil or metal deposition film made of a metal such as aluminum, or a resin film such as of polyvinyl alcohol, an ethylene/vinyl alcohol copolymer, polyvinylidene chloride or the like.

Although the metal foil or metal deposition film is excellent in gas barrier properties, there may be problems that products cannot be confirmed because of opaqueness thereof, cracks occur by several percent elongation owing to poor elasticity thereby causing gas barrier properties to lower, and they may need to be treated as an incombustible waste at the time of disposal after use.

Although gas barrier films having a resin film such as polyvinyl alcohol, ethylene/vinyl alcohol copolymer or the like show excellent gas barrier properties under low humidity, the gas barrier properties lower as temperature rises and are even lost at a humidity of not less than 70% R.H. Thus, some limitation is placed on their use. There is a method of lowering humidity dependence wherein an inorganic layered compound is added to polyvinyl alcohol or ethylene/vinyl alcohol copolymer. However, this method cannot well lead up to an improvement and involves an adverse effect of lowering adhesion between the base substrate and the resin film, thus making it difficult to obtain strength sufficient to withstand use as a packaging material.

On the other hand, a gas barrier film having a resin film such as polyvinylidene chloride is low in humidity dependence and thus tends to show excellent gas barrier properties. Nevertheless, the film has the possibility of causing a generation source of harmful substances at the time of disposal treatment and thus, gas barrier materials that do not contain chlorine-based materials are more desirable.

Accordingly, it is preferable that a gas barrier resin film which is made of a chlorine-based material-free material, has high gas barrier properties in an atmosphere of high humidity, and shows good adhesion to base substrates.

There may be a gas barrier film where an aqueous polyurethane is added to the above-mentioned composite material of polyvinyl alcohol or ethylene-vinyl alcohol copolymer and an inorganic layered compound, so that adhesion between the gas barrier resin film and a base substrate is improved. However, this gas barrier film may not be satisfactory with respect to gas barrier properties in an atmosphere of a high humidity of not less than 80% R.H.

Further, there may be a gas barrier resin laminate film which is comprised of a polyurethane having a high concentration of urethane group or urea group and a polyamine compound and has good adhesion to a base substrate and low humidity dependence. However, this gas barrier resin laminate film tends to be poorer in gas barrier properties than the above-mentioned resin film made of polyvinylidene chloride and thus, limitation is placed on its range of applications as a gas barrier packaging material.

Moreover, with a laminate of a type having a heat-sealing resin layer laminated on a gas barrier film through an adhesive, although initial laminate strength is good, the lamination strength lower as time passes under long-term storage in an atmosphere of high humidity, with the attendant problem that part of the laminate film peels off (referred to as "delamination")

One embodiment of the present invention provides an aqueous coating agent and a gas barrier film which ensure excellent gas barrier properties in an atmosphere of high humidity or are good at adhesion to a base film, and a gas barrier laminate which is free of delamination failure.

The aqueous coating agent according to a first embodiment of the invention includes, major constituents, (A) an aqueous polyurethane resin containing a polyurethane resin having an acid group and a polyamine compound, (B) a water-soluble polymer, and (C) an inorganic layered mineral, wherein formulation ratios, as occupied in a total solid content, of the aqueous polyurethane resin (A), the water-soluble polymer (B) and the inorganic layered mineral are within the following ranges, and a total solid concentration is not less than 5 mass % and a viscosity at 23° C. is not larger
than 50 mPa-second,
the aqueous polyurethane resin (A) being at 50-80 mass %,
the water-soluble polymer (B) being at 5-20 mass %, and
the inorganic layered mineral being at 10-30 mass %.

In the first embodiment of the invention, the water-soluble polymer (B) is preferably made of a polyvinyl alcohol resin which has a degree of saponification of not less than 95% and a degree of polymerization of 300-2000.

In the first embodiment of the invention, the inorganic layered mineral (C) is preferably made of a water-swelling synthetic mica.

The gas barrier film according to a second embodiment of the invention includes a base film made of a plastic material and a film layer which is formed on one or both surfaces of the base film and includes, as major constituents, (A) an aqueous polyurethane resin containing a polyurethane resin having an acid group and a polyamine compound, (B) a water-soluble polymer, and (C) an inorganic layered mineral, ratios of the aqueous polyurethane resin (A), the water-soluble polymer (B) and the inorganic layered mineral (C) present in the film are within the following ranges of
  50-80 mass % of the aqueous polyurethane resin (A),
  5-20 mass % of the water-soluble polymer (B), and
  10-30 mass % of the inorganic layered mineral (C).

The gas barrier film according to the second embodiment of the invention is preferably such that the water-soluble polymer (B) is made of a polyvinyl alcohol resin having a degree of saponification of not less than 95% and a degree of polymerization of 300-2000.

In the second embodiment of the invention, it is preferred that the inorganic layered mineral (C) is made of a water-swelling synthetic mica.

The gas barrier laminate according to a third embodiment of the invention is one wherein there are successively laminated, on a base film made of a plastic material, at least a gas barrier layer, a protective layer, an adhesive layer, and a heat-sealable resin layer. The gas barrier layer is a film which includes, as major constituents, (A1) an aqueous polyurethane resin containing a polyurethane resin having an acid group and a polyamine compound, a water-soluble polymer (B1) and an inorganic layered mineral (C1), formulation ratios of the aqueous polyurethane resin (A1), the water-soluble polymer (B1) and the inorganic layered mineral (C1) present in the film are within the following ranges of
  50-80 mass % of the aqueous polyurethane resin (A),
  5-20 mass % of the water-soluble polymer (B), and
  10-30 mass % of the inorganic layered mineral (C).

In the third embodiment of the invention, the water-soluble polymer (B1) is preferably made of a polyvinyl alcohol resin having a degree of saponification of not less than 95% and a degree of polymerization of 300-2000.

In the third embodiment of the invention, it is preferred that the inorganic layered mineral (C) is made of a water-swelling synthetic mica.

In the third embodiment of the invention, the protective layer is preferably formed of any of materials, all based on polyurethane, isocyanate, polybutadiene, polyethyleneimine polyester or acrylic polyol, according to a wet coating method.

The aqueous coating agent of the first embodiment of the invention includes, as major constituents, an aqueous polyurethane (A), a water-soluble polymer (B) and an inorganic layered mineral (C) wherein the solid content ratios of these constituents are controlled within predetermined ranges. As a result, the film formed from the aqueous coating agent becomes excellent in gas barrier properties in an atmosphere of high humidity and is good at adhesion to a base substrate and also at cohesive force. Thus, when the gas barrier film made of this layer film is used as a packaging material, product quality retention can be enhanced and the film can be made use as a variety of packaging materials.

Further, since the aqueous coating agent of the first embodiment of the invention is low in viscosity irrespective of the high solid concentration, productivity can be increased in the step of coating onto a base substrate.

The gas barrier film of the second embodiment of the invention has a film which includes, as major constituents, an aqueous polyurethane resin (A), a water-soluble polymer (B) and an inorganic layered mineral (C) wherein the solid content ratios of these constituents are controlled within predetermined ranges. As a result, the film becomes excellent in gas barrier properties in an atmosphere of high humidity and is good at adhesion to a base substrate and also at cohesive force. Thus, when this film is used as a packaging material, product quality retention can be enhanced and the film can be made use as a variety of packaging materials.

The gas barrier laminate of the third embodiment of the invention is one wherein at least a gas barrier layer, a protective layer, an adhesive layer, a heat-sealable are successively laminated on a base film made of a plastic material. The gas barrier layer is made of a film containing as major constituents an aqueous polyurethane resin (A1) containing a polyurethane resin having an acid group and a polyamine compound, a water-soluble polymer (B1) and an inorganic layered mineral (C1). Because the solid content ratios of these constituents are controlled within predetermined ranges and the protective layer is interposed between the gas barrier layer and the adhesive layer, excellent gas barrier properties in an atmosphere of high humidity are ensured, the lowering of laminate strength with time is small, and no failure of delamination occurs. The laminate can be enhanced in product quality retention over a long term when used as a packaging material and can be made use as a variety of packaging materials. Additionally, occurrence of harmful substances can be suppressed at the time of disposal.

With the gas barrier laminate of the third embodiment of the invention, the protective layer is formed of any of materials, all based on polyurethane, isocyanate, polybutadiene, polyethylene imine, polyester or acrylic polyol, according to a wet coating method. Such a laminate can be easily, inexpensively fabricated by use of conventional, general materials and processing machines without impeding gas barrier properties and laminate strength in an atmosphere of high humidity.

INDUSTRIAL APPLICABILITY

The invention is applicable to an aqueous coating agent and a gas barrier film usable in the fields of packaging foods, which hate moisture or oxygen, such as dried foods, snacks, breads, delicacies and the like and medicinal products such as disposable body warmers, tablets, powders, poultice, adhesive skin patches and the like.

Obviously, numerous modifications and variations of the present invention are possible in light of the above teachings. It is therefore to be understood that within the scope of the appended claims, the invention may be practiced otherwise than as specifically described herein.

The invention claimed is:

1. An aqueous coating composition, comprising:
   an aqueous polyurethane resin comprising a polyurethane resin having an acid group and a polyamine compound;
   a water-soluble polymer comprising a polyvinyl alcohol polymer; and
   an inorganic layered mineral,
   wherein the aqueous polyurethane resin is included at a solid content of 50-80 mass %, the water-soluble polymer is included at a solid content of 5-20 mass %, and the inorganic layered mineral is included at a solid content of 10-30 mass %, relative to a total solid content of the aqueous coating composition, the acid group of the polyurethane resin is at least one of a carboxyl group and a sulfonic group, and the aqueous coating composition has a total solid concentration of not less than 5 mass % and a viscosity of not larger than 50 mPa-second at 23° C.

2. The aqueous coating composition as defined in claim 1, wherein the polyvinyl alcohol polymer comprises a polyvinyl alcohol resin having a degree of saponification of not less than 95% and a degree of polymerization of 30-2000.

3. The aqueous coating composition as defined in claim 2, wherein the inorganic layered mineral comprises a water-swellable synthetic mica.

4. The aqueous coating composition as defined in claim 1, wherein the inorganic layered mineral comprises a water-swellable synthetic mica.

5. The aqueous coating composition as defined in claim 1, wherein the inorganic layered mineral comprises montmorillonite.

6. The aqueous coating composition as defined in claim 1, wherein the polyurethane resin has the acid group on a side chain.

7. A gas barrier film, comprising:
   a base film comprising a plastic film; and
   a film layer formed on the base film and comprising an aqueous polyurethane resin, a water-soluble polymer, and an inorganic layered mineral,
   wherein the aqueous polyurethane resin comprises a polyurethane resin having an acid group and a polyamine compound, the water-soluble polymer comprises a polyvinyl alcohol polymer, the acid group of the polyurethane resin is at least one of a carboxyl group and a sulfonic group, and the film layer includes 50-80 mass % of the aqueous polyurethane resin, 5-20 mass % of the water-soluble polymer, and 10-30 mass % of the inorganic layered mineral.

8. The gas barrier film as defined in claim 7, wherein the polyvinyl alcohol polymer comprises a polyvinyl alcohol resin having a degree of saponification of not less than 95% and a degree of polymerization of 30-2000.

9. The gas barrier film as defined in claim 8, wherein the inorganic layered mineral comprises a water-swellable synthetic mica.

10. The gas barrier film as defined in claim 7, wherein the inorganic layered mineral comprises a water-swellable synthetic mica.

11. The gas barrier film as defined in claim 7, wherein the inorganic layered mineral comprises montmorillonite.

12. The gas barrier film as defined in claim 7, wherein the polyurethane resin has the acid group on a side chain.

13. A gas barrier laminate, comprising:
- a base film comprising a plastic material;
- a gas barrier layer formed on the base film;
- a protective layer formed on the gas barrier layer;
- an adhesive layer formed on the protective layer; and
- a heat-sealable resin layer formed on the adhesive layer,
- wherein the gas barrier layer is a film comprising an aqueous polyurethane resin, a water-soluble polymer, and an inorganic layered mineral,
- the aqueous polyurethane resin comprises a polyurethane resin having an acid group and a polyamine compound,
- the water-soluble polymer comprises a polyvinyl alcohol polymer,
- the acid group of the polyurethane resin is at least one of a carboxyl group and a sulfonic group, and
- the film formed by the gas barrier layer includes 50-80 mass % of the aqueous polyurethane resin, 5-20 mass % of the water-soluble polymer, and 10-30 mass % of the inorganic layered mineral.

14. The gas barrier laminate as defined in claim 13, wherein the polyvinyl alcohol polymer has a degree of saponification of not less than 95% and a degree of polymerization of 30-2000.

15. The gas barrier laminate as defined in claim 14, wherein the inorganic layered mineral comprises a water-swellable synthetic mica.

16. The gas barrier laminate as defined in claim 13, wherein the inorganic layered mineral comprises a water-swellable synthetic mica.

17. The gas barrier laminate as defined in claim 13, wherein the protective layer comprises at least one of polyurethane, isocyanate, polybutadiene, polyethyleneimine, polyester and acrylic polyol and is formed by a wet coating method.

18. The gas barrier laminate as defined in claim 13, wherein the inorganic layered mineral comprises montmorillonite.

19. The gas barrier laminate as defined in claim 13, wherein the polyurethane resin has the acid group on a side chain.

20. The aqueous coating composition as defined in claim 1, wherein the polyvinyl alcohol polymer comprises a polyvinyl alcohol resin having a degree of saponification of from 98 to 99% and a degree of polymerization of from 300 to 1700.

* * * * *